May 22, 1934.  H. S. MACADIE  1,959,592

MULTIRANGE ELECTRICAL MEASURING INSTRUMENT

Filed June 13, 1933  3 Sheets-Sheet 1

Hugh Sutherland Macadie
INVENTOR;
his Attorney.

May 22, 1934.  H. S. MACADIE  1,959,592
MULTIRANGE ELECTRICAL MEASURING INSTRUMENT
Filed June 13, 1933   3 Sheets-Sheet 2

Hugh Sutherland Macadie
INVENTOR
his Attorney

May 22, 1934.                H. S. MACADIE                1,959,592
         MULTIRANGE ELECTRICAL MEASURING INSTRUMENT
                   Filed June 13, 1933            3 Sheets-Sheet 3

Patented May 22, 1934

1,959,592

UNITED STATES PATENT OFFICE 1,959,592

MULTIRANGE ELECTRICAL MEASURING INSTRUMENT

Hugh Sutherland Macadie, Westminster, London, England, assignor to The Automatic Coil Winder & Electrical Equipment Company, Limited, a company of Great Britain and Ireland Application June 13, 1933, Serial No. 675,529
In Great Britain July 6, 1932

16 Claims. (Cl. 171—95)

This invention relates to improvements in multi-range electrical measuring instruments, and has for its chief object to provide a simple and efficient instrument by means of which a number of ranges of alternating current voltages and current values may be readily and quickly measured. Since it is desirable to be able to measure also by means of the same instrument values of direct current voltages and currents, and possibly also resistances, a further object of the present invention is to provide an electrical measuring instrument employing only a single meter which can measure various ranges of voltages and currents, whether the measurements are to be carried out on alternating current or direct current, and which may also be used to measure resistances.

According to the present invention, there is provided in the measuring instrument a rectifier to rectify the alternating currents to be measured, said rectifier preferably being a full wave rectifier, and the alternating currents to be measured are fed to the rectifier through a transformer.

Now in a multi-range measuring instrument, it is highly desirable to ensure that the meter shall have the same scale shape, as the divisions of the scale may then be marked with arbitrary figures which have to be multiplied by a constant depending upon the range. The provision of a multi-range measuring instrument having the same scale shape for all ranges when the instrument is intended for use on direct current only is not a matter of difficulty, since the problem of adapting the instrument to read the various ranges is then merely a matter of including in the meter circuit suitable shunt and series resistance. One very convenient form of multi-range electrical measuring instrument which, by means of a single moving coil movement, is adapted to measure various ranges of voltages and currents, and which is also adapted to give a direct measurement of resistance, is that covered by British Patent No. 200,977. The same scale shape is secured for the voltage and current readings in that instrument, and it is, therefore, merely a matter of adjusting the switch to the appropriate range and then to multiply the reading given by the pointer by the appropriate constant applicable to the range in question.

When, however, the measuring instrument is to be used on alternating current circuits, it is not so easy to secure the same scale shape. This is due to the fact that the applied volts-rectified current curve of the rectifier, particularly of a metal rectifier, is not a straight line for low applied voltages. More particularly, the usual type of metal rectifier at present manufactured and sold requires the application of approximately one half of a volt before the same commences to rectify. This is not, of course, of any material consequence when the instrument is set to ranges which give a full scale deflection of the order of 120 volts or 1,200 volts but, when the instrument is set to a low voltage range giving, say, a full scale deflection when measuring, say, 1.2 volts, the feature above referred to is of considerable consequence and operates to prevent the same scale shape on all the ranges being obtained unless special precautions are taken. The provision of a plurality of scales in a multi-range instrument leads to confusion and is most undesirable. This disadvantage is, according to the present invention, overcome by means of a transformer through which the alternating currents to be measured are fed to the rectifier in such a manner that for any given proportion of the basic full scale value on each given range, the secondary output current as fed to the rectifier is constant.

The feeding of the current to the rectifier through a transformer will also have the advantage that the instrument may be used to measure the amount of alternating current superposed on a steady or direct current, since, provided saturation current is not reached, the alternating component will alone be transformed by the transformer and measured by the meter.

In order that this invention may be the more clearly understood and readily carried into effect, I will proceed to describe the same with reference to the accompanying drawings, which illustrate by way of example and not of limitation one convenient embodiment of this invention as applied to a combined alternating current and direct current multi-range measuring instrument, and in which.

Figure 6:
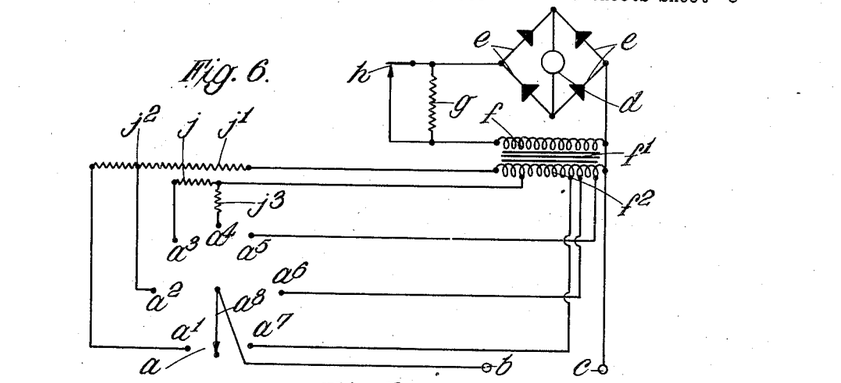
Figure 6 is a circuit diagram of an alternating current multi-range measuring instrument according to this invention.

Referring now firstly to Figure 6 of the accompanying drawings, which shows the circuit of the alternating current portion of the measuring instrument illustrated in the accompanying drawings, the instrument therein shown is adapted to measure four ranges of alternating voltages (say, 1,200 volts, 120 volts, 12 volts and 1.2 volts for full scale deflection on each range) and three ranges of alternating currents (say, 12 amperes, 1.2 amperes and .12 amperes for full scale deflection on each range). The instrument is provided with a switch $a$ having seven contacts $a^1$, $a^2$, $a^3$, $a^4$, $a^5$, $a^6$ and $a^7$, each of which corresponds to one range, the arm $a^8$ of the switch, which is connected to one ($b$) of the input terminals $b$ and $c$ to the measuring apparatus, being adapted to make contact with any one of the studs $a^1$ to $a^7$. The moving coil meter or movement $d$ is connected across a bridge arranged full wave metal rectifier $e$, the rectifier being connected in the known manner to the secondary $f$ of the transformer $f^1$. One of the ends of the secondary winding $f$ is connected to one of the ends of the primary winding $f^2$ which, in turn, is connected to the other input terminal $c$ of the measuring apparatus. One of the leads from the rectifier $e$ to the secondary winding, preferably that one connecting the rectifier with that end of the secondary winding $f$ which is not connected directly to the primary winding $f^2$, includes a resistance $g$, a shorting switch $h$ being connected across this resistance for the purpose hereinafter described.

The primary winding $f^2$ of the transformer $f^1$ has, say, 2,000 turns and is tapped at the following turn points from that end of the primary which is connected to the secondary which has, say, 1,680 turns:—1, 10, 100 and 130, these tappings being connected to the studs or contacts $a^5$, $a^6$, $a^7$ and (through a resistance to the stud) $a^4$ respectively on the switch corresponding to the 12 amperes, 1.2 amperes, .12 amperes and 1.2 volt ranges respectively. The 12 volt range contact $a^3$ on the switch is connected through a resistance $j$ of, say, 130 ohms to the 130 turn tapping on the primary $f^2$. The other end of the primary is connected through a preferably non-inductive resistance $j^1$, bringing the circuit resistance up to, say, 200,000 ohms to the 1,200 volt contact $a^1$ on the switch, and the 120 volt contact $a^2$ on the switch is connected to a tapping point $j^2$ on this resistance such that the total circuit impedance is approximately 20,000 ohms, or slightly less.

The shorting switch $h$ across the resistance $g$ in the connection between the secondary $f$ and the rectifier $e$ is so coupled to or mounted on the main switch $a$ that it is closed to short circuit this resistance at all times except when the switch is set to the 1.2 volts range.

The transformer acts as a current transformer, and for any given number of primary ampere turns there will be a definite secondary current and pointer indication.

When it is desired to take a voltage reading, the circuit leads are connected to the input terminals $b$ and $c$ of the measuring apparatus and the switch $a$ is set to the appropriate range. Let us assume that it is set to the 1,200 volt range, i. e., contact $a^1$. Current will then flow through the whole of the resistance $j^1$ and the whole of the primary $f^2$. The resistance $j^1$ in series with the primary $f^2$ will not only limit the current flowing through the primary winding $f^2$, but will also serve to render negligible the effect of the reactance of the complete transformer on the total impedance of the instrument. Thus, with a suitably designed transformer, the readings will be substantially independent of the frequency of the supply, provided the same is of an ordinary commercial supply frequency and does not extend to a high audio or radio frequency. The current flowing through the primary will be transformed into a current flowing in the secondary and the primary-secondary ratio is so arranged, both for this range and also for the 120 volt, 12 volt and 1.2 volt ranges, that for full scale deflection the current flowing in the secondary circuit is such that, when rectified, it corresponds to that current required to produce a full scale deflection of the moving coil meter $d$. Thus, if we assume that a current of 6 milliamperes is required for a full scale deflection of the moving coil meter, then the current flowing in the secondary winding should equal this current multiplied by the form factor (1.11 assuming a sine wave), i. e., 6.66 milliamperes.

On the 1,200 and 120 volt ranges, the primary and secondary turns are comparable, and the effect of the secondary voltage when referred to the primary side is rendered negligible by the high series resistance. The primary current and ampere turns will, therefore, be proportional to the applied voltage.

For the 120 volt range, i. e., contact $a^2$, the supply is tapped on to the resistance $j^1$ at the point $j^2$ in series with the primary winding $f^2$ and also flows through the whole of the primary winding. The total impedance of the instrument for this range is adjusted to one tenth of the impedance for the 1,200 volt range, and so the same current will flow in the primary circuit and will be transformed into a like current (6.66 milliamperes in the case assumed) in the secondary circuit $f$. Since the primary current is proportional to the applied volts, the same scale shape is, therefore, obtained for both of these ranges.

Now, with regard to the 12 volt range, i. e., the stud $a^3$, the connection to the primary winding when this range is being measured includes many less turns than on the higher voltage ranges. The resistance $j$ included, however, is still sufficient to render negligible the reduced effect of the reactance of the part of the transformer on the total impedance of the instrument and so this range also will be substantially independent of the frequency of the supply. Also the reduced effect of the secondary E. M. F. when referred to the primary side is rendered negligible by the comparatively high primary resistance so that the primary current and ampere turns are still proportional to the applied volts. Since the number of turns in the effective primary winding is much less, it will be necessary to pass a larger current through the primary. The current passed is, however, such that the ampere-turns constant is the same as with the ranges hereinbefore mentioned, so that the current flowing in the secondary circuit is again 6.66 milliamperes for full scale deflection for the meter assumed and is reduced in the same proportion as on the other ranges considered for intermediate values of 12 volts. This arrangement will, therefore, again give the same scale shape for the 12 volt range. Whereas the transformer acted as a step-down transformer for the 1,200 volt and 120 volt ranges, it acts as a step-up transformer on the 12 volt range on account of the comparatively small number of turns included in the effective primary winding.

For the 1.2 volt range, the supply is connected from the stud $a^4$ to the 130 turn tapping on the primary winding $f^2$ through a small resistance $j^3$ of, say, .5 ohm, as above described, since it is essential that the primary IR-drop be kept low, and this is best done in a transformer of limited dimensions, by reducing the number of primary turns, although the advantage thereby secured is partly off-set by the increased current consumption of the primary.

The full scale secondary current of 6.66 milliamperes flows through a resistance $g$ of approximately 700 ohms, and the rectifier $e$, and consequently the secondary of the transformer, must develop approximately 6 volts on this range though this will be approximately one half a volt when referred to the primary side, due to the step-up primary-secondary ratio of the transformer.

As the voltage of the rectifier at its A. C. terminals varies from approximately one half to one volt between one twelfth to full load, both the secondary and primary voltages must vary accordingly from this cause, and the same scale shape could not be employed unless this non-linear effects is rendered negligible.

This is accomplished by passing the secondary current through the resistance $g$ so that the secondary current will be practically proportional to the secondary volts. The small resistance $f^3$ is for adjusting purposes so that the primary IR-drop, when added to that referred from the secondary side, will be suitable for this purpose.

As before, the value of primary turns and added secondary resistance are such as to give full scale deflection on 1.2 volts, and a similar scale shape as before. We, therefore, provide the resistance $g$ in the secondary lead above referred to and the shorting switch $h$ therefor, this switch being closed to short out the resistance $g$ on all ranges except the 1.2 volt range. When the main switch $a$ is set to the 1.2 volt range, i. e., stud $a^4$, the shorting switch $h$ is opened, and the resistance $g$ is included in the circuit.

On all voltage ranges, therefore, we secure the same scale shape, and it is merely necessary to mark the scale $k$ (see Figure 1) with arbitrary numbers which have to be multiplied by a constant corresponding to the range being measured.

The same scale may also be used for the current readings, and the tappings connected to the studs $a^5$, $a^6$ and $a^7$ for the current readings are so arranged that, at full scale deflection, the same ampere turns product is secured on all ranges. Thus, for full scale deflection a current of 6.66 milliamperes will flow in the secondary circuit, thus enabling the same scale shape to be secured.

The transformer acts as a current transformer and the slight variation in impedance and back E. M. F. with frequency is not of any consequence when measuring current.

It will be appreciated, therefore, that the instrument above described will cover a large number of useful ranges in alternating current and voltage readings, and, furthermore, will be simple to use and read, no confusion arising from a multitude of scales.

The values for the various resistances and tappings on the primary of the transformer above referred to must not be taken to be in any way limitative, as they are given merely as examples of one instrument and for the purpose of facilitating the explanation of the present invention. The same would, of course, be varied to suit other moving coil meters and other ranges of voltage and current measurements if the same be desired.

Figure 1:
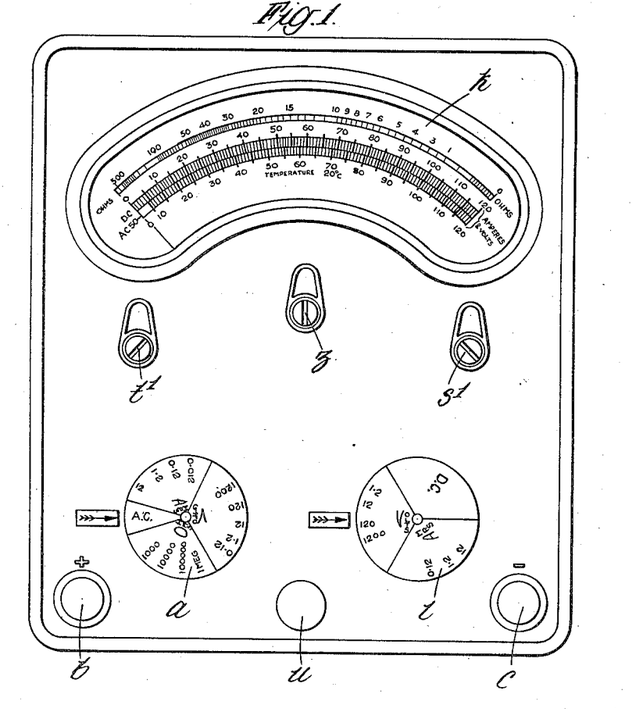
Figure 1 is a face view of the complete instrument.
Figure 2:
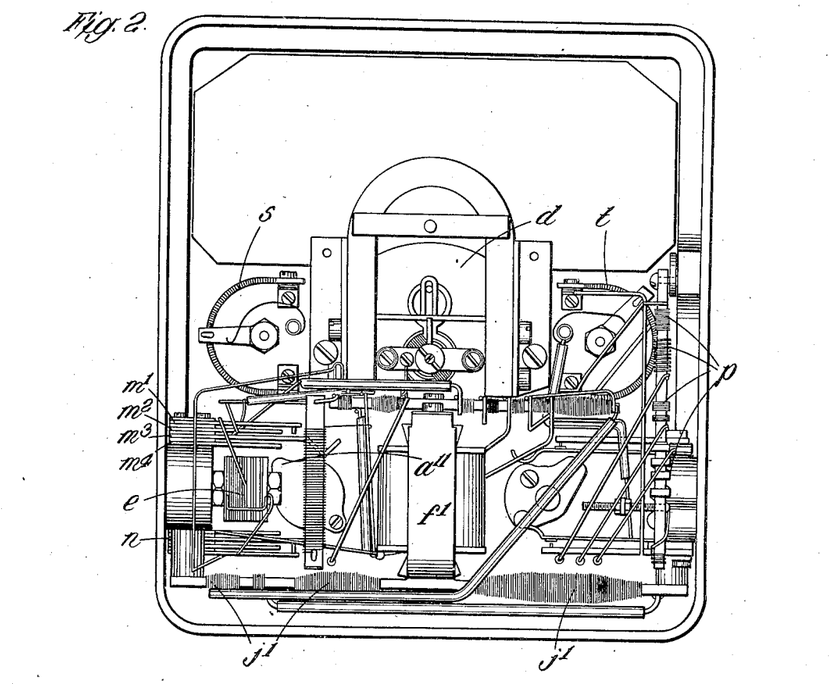
Figure 2 is a rear view of the same with the outer cover removed.
Figure 3:
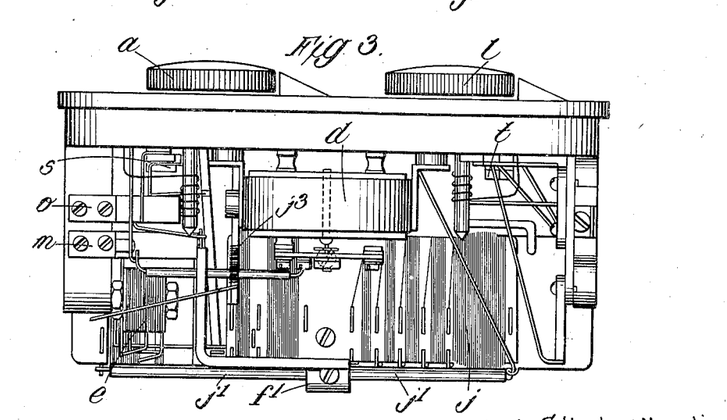
Figure 3 is a plan view of the instrument also with the outer cover removed.
Figure 7:
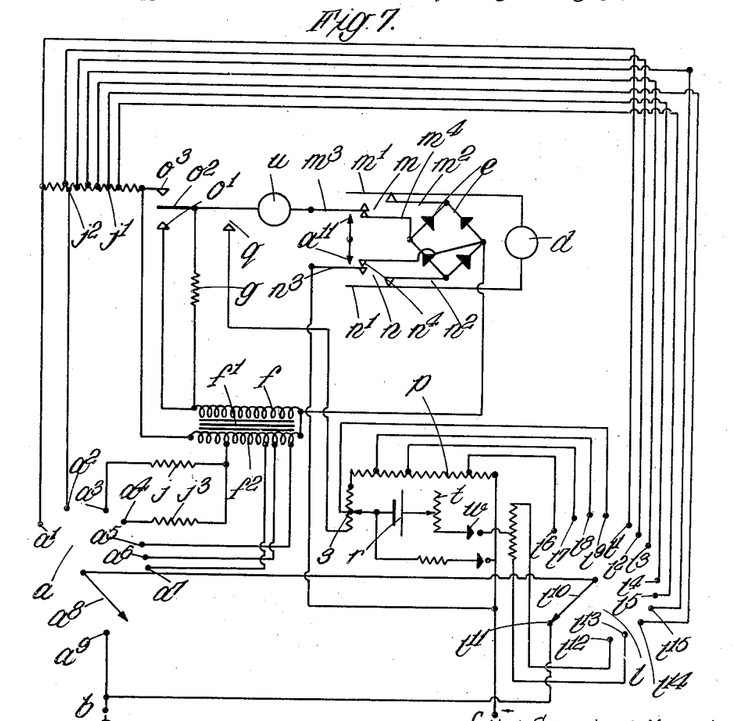
Figure 7 is a circuit diagram of the instrument shown in Figures 1 to 3.

Since many of the components necessary to measure A. C. and D. C. voltages and currents are common to both sets of measurements, the above described instrument may conveniently be combined with the apparatus necessary to carry out D. C. measurements. Such an instrument is shown in Figures 1 to 3 of the accompanying drawings, and the circuit diagram thereof is shown in Figure 7. Like reference characters have been used in Figure 7 to indicate the like parts shown in Figure 6. The ranges for D. C. measurements may be wider and may comprise the following ranges of voltages and currents, viz., 1,200 volts, 120 volts, 12 volts, 1.2 volts and .12 volts and 12 amperes, 1.2 amperes, .12 amperes and 12 milliamperes. When a combined A. C. and D. C. measuring instrument is proposed, in addition to the A. C. range switch $a$ above referred to, a D. C. range switch $l$ is provided, said switch $l$ being of a similar construction to the A. C. switch $a$ and having contacts $l^1$, $l^2$, $l^3$, $l^4$, $l^5$, $l^6$, $l^7$, $l^8$ and $l^9$, one for each of the ranges mentioned above, and a contact arm $l^{10}$. Common input terminals $b$ and $c$ may be used, and in this case, one of the input terminals $b$, instead of being connected to the switch arm $a^8$ of the A. C. range switch $a$, would be connected to an additional contact $a^9$ on the A. C. range switch marked "D. C. readings", and this terminal would likewise be connected to an additional contact $l^{11}$ on the D. C. range switch $l$ marked "A. C. readings". The two switch arms $a^8$ and $l^{10}$ are then connected together electrically, and it will be seen that D. C. readings can only be obtained when the A. C. range switch is set to the "D. C. readings" position stud $a^9$, and A. C. readings can only be secured when the D. C. range switch $l$ is set to the "A. C. readings" position stud $l^{11}$. For D. C. readings, the transformer and rectifier are unnecessary and the A. C. range switch would be provided with certain additional switches $m$, $n$ and $o$, preferably operated by a cam on the spindle thereof, as hereinafter described, firstly to disconnect the rectifier from the transformer, secondly to disconnect the moving coil meter $d$ from the rectifier $e$, and thirdly to connect the resistance in series with the primary of the transformer in series with the moving coil meter.

*Switching arrangements for changing from A. C. measurements to D. C. measurements*

These switching arrangements, as above mentioned, comprise switches $m$, $n$ and $o$. The siwtches $m$ and $n$ are arranged one above and the other below the spindle $a^{10}$ of the A. C. switch (see Figure 4), and each comprises four contact blades $m^1$, $m^2$, $m^3$ and $m^4$ and $n^1$, $n^2$, $n^3$ and $n^4$, one of each of these sets of contact blades ($m^3$ and $n^3$) being extended so as to be engaged at the appropriate point in the rotation of the A. C. switch $a$ by cam projections $a^{11}$ on the spindle $a^{10}$ of the A. C. switch. The two switches $m$ and $n$ are identical and are so arranged that, when the contact blades $m^3$ and $n^3$ are not engaged by the cam projections $a^{11}$, the contact blades $m^1$ and $m^2$ are in electrical connection and the contact blades $m^3$ and $m^4$ are also in electrical connection with one another. When, however, the contact blade $m^3$ is engaged by the cam projection, the connection between $m^1$ and $m^2$ and $m^3$ and $m^4$ is broken (see Figure 4) and the blade $m^3$ is moved into contact with the blade $m^1$.

Figure 4:
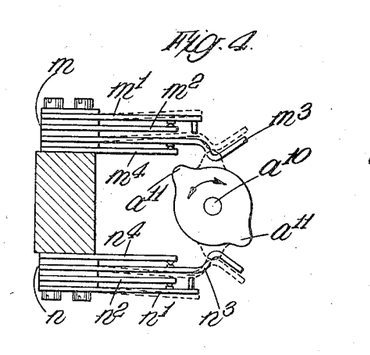
Figure 4 is a detail view showing the operation of certain switches.

Similar operation is secured of the switch n, and the positioning of the cam projections $a^{11}$ on the spindle $a^{10}$ is so arranged that the blades $m^3$ and $n^3$ are only moved when the A. C. switch a is set to the D. C. position, i. e., when the measuring instrument is adjusted for D. C. readings. The switches m and n are employed to disconnect the rectifier e from the transformer and from the moving coil meter and also to connect the meter in circuit appropriately for the D. C. measurements. Thus the meter d is connected to the contact blades $m^1$ and $n^1$ and the D. C. output points of the rectifier e are connected to the contact blades $m^2$ and $n^2$. The contact blade $m^3$ is connected to the one end of the secondary winding f of the transformer $f^1$ through a further switch o, hereinafter referred to, and the blade $n^3$ is connected to the input terminal c. The contact blades $m^4$ and $n^4$ are connected to the A. C. input points of the rectifier e, and the contact $n^4$ is also connected to the transformer junction between the primary and secondary. Thus, it will be seen that until such time as the A. C. switch is set to the D. C. position the meter d is appropriately connected to the rectifier and transformer to give A. C. readings whilst, as soon as the A. C. switch a is set to the D. C. position, the meter d is disconnected from the rectifier and connected, on the one hand, to input terminal c and, on the other hand, to the switch o.

Figure 5:
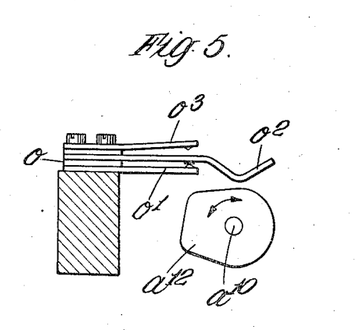
Figure 5 is a view showing the operation of certain further switches.

A further switch o is provided, this switch being of the simple change-over type. It comprises contact blades $o^1$, $o^2$ and $o^3$, the blade $o^2$ being adapted to be engaged by a cam $a^{12}$ on the spindle $a^{10}$ of the A. C. switch to move it out of contact with the blade $o^1$ into contact with the blade $o^3$. When the blade $o^2$ is in contact with the blade $o^1$ (all A. C. positions except the 1.2 volts range), this connects the rectifier e to the transformer f, whilst, when the cam moves the blade $o^2$ into contact with the blade $o^3$, this disconnects the transformer and brings the resistance j into series with the meter d. If desired, the switch n above referred to may be combined with the switch o by so shaping the cam $a^{12}$ that for all A. C. positions, except the 1.2 volts range it causes the blade $o^2$ to make contact with the blade $o^1$, for the 1.2 volts range it leaves the blade $o^2$ free between the blades $o^1$ and $o^3$, thus bringing the resistances g into circuit, and for the D. C. reading position brings the blade $o^2$ into contact with the blade $o^3$, as above explained.

The resistance $j^1$ is provided with tappings connected to the D. C. range voltage switch contacts $l^1$ to $l^5$ to include the required amount of resistance in circuit for the various voltage ranges and, for the current ranges, a shunt resistance p is provided, suitably tapped to the D. C. switch contacts $l^6$ to $l^9$, to adjust the value of the shunt resistance, this shunt resistance being thrown across the meter d by means of a switch q (see Figure 7) which is operated by the D. C. switch and is closed when the D. C. switch is set for current readings. Since the D. C. reading part of the instrument is substantially in accordance with the arrangement described in the patent above referred to, reference may be made to the specification thereof for further details. Means, for example, a battery r, adjustable resistances s and t and contacts $l^{12}$, $l^{13}$, $l^{14}$ and $l^{15}$ may also be incorporated in the D. C. part of the instrument to read one or more ranges of resistances in the manner referred to in the said patent. The contact studs $l^{14}$ and $l^{15}$ enable high values of resistances to be measured by means of an external battery or source of supply of a given voltage. A fuse u may, if desired, be provided to protect the rectifier and the moving coil meter. w is a switch in the circuit of the battery r to open this circuit when resistance measurements are not being taken.

$s^1$ and $t^1$ (Figure 1) are screws for adjusting the resistances s and t, and z is the zero adjustment.

The instrument, according to the present invention, has many advantages, among which may be mentioned the following; as above stated, the A. C. scale shape on all ranges is practically evenly divided and, therefore, it is possible to cover a wide range of measurements with fewer ranges than if a contracting or opening scale shape is employed; the instrument only consumes a small amount of power.

It will be appreciated that many modifications may be made in the above described arrangements without departing from the scope of the present invention. The preceding details are merely of certain convenient arrangements which we have chosen to describe in order that the nature of this invention may be clearly understood.

I claim as my invention:

1. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a switch to connect the A. C. input to the appropriate tapping on the transformer primary, switching means to disconnect the movement from the rectifier when D. C. readings are to be taken, a series resistance and a shunt resistance for said movement, tappings on said series and shunt resistances and switch means to connect a D. C. input to the appropriate tapping on the series or shunt resistance for D. C. voltage or current measurements.

2. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a switch to connect the A. C. input to the appropriate tapping on the transformer primary, switching means to disconnect the movement from the rectifier and from the transformer when D. C. readings are to be taken, a series resistance, switch means to connect said series resistance in series with the primary of the transformer for voltage reading on A. C. or alternatively in series with the movement when said movement is disconnected from the rectifier for voltage readings on D. C., a shunt resistance for said movement, switching means to connect said shunt resistance across the movement for current readings on D. C., tappings on said series and shunt resistances and switch means to connect a D. C. input to the appropriate tapping on the series or shunt resistance for D. C. voltage or current measurements.

3. A multi-range combined current and voltage measuring instrument for A. C. and D. C.

comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a series resistance connected to one of the tappings on said primary, a switch to connect the A. C. input to the appropriate tapping or to the series resistance connected to the one tapping on the transformer primary, switching means to disconnect the movement from the rectifier when D. C. readings are to be taken, a series resistance and a shunt resistance for said movement, tappings on said series and shunt resistances and switch means to connect a D. C. input to the appropriate tapping on the series or shunt resistance for D. C. voltage or current measurements.

4. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a series resistance connected to one of the tappings on said primary, a switch to connect the A. C. input to the appropriate tapping or to the series resistance connected to the one tapping on the transformer primary, switching means to disconnect the movement from the rectifier and from the transformer when D. C. readings are to be taken, a series resistance, switch means to connect said series resistance in series with the primary of the transformer for voltage readings on A. C. or alternatively in series with the movement when said movement is disconnected from the rectifier for voltage readings on D. C., a shunt resistance for said movement, switching means to connect said shunt resistance across the movement for current readings on D. C., tappings on said series and shunt resistances and switch means to connect a D. C. input to the appropriate tapping on the series or shunt resistance for D. C. voltage or current measurements.

5. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, a resistance in series with said transformer secondary and said rectifier, switch means for shorting said resistance at all times except when the instrument is set to measure A. C. voltages of a range the full scale deflection of which is comparable with the A. C. voltage under which the applied volts-rectified volts characteristic of the rectifier is not straight, the arrangement being such that for any given proportion of the full scale value on any given range, the secondary output current as fed to the rectifier is constant, whereby the same scale shape is obtained on all ranges, tappings on the transformer primary winding, a switch to connect the A. C. input to the appropriate tapping on the transformer primary, switching means to disconnect the movement from the rectifier when D. C. readings are to be taken, a series resistance and a shunt resistance for said movement, tappings on said series and shunt resistances and switch means to connect a D. C. input to the appropriate tapping on the series or shunt resistance for D. C. voltage or current measurements.

6. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, a resistance in series with said transformer secondary and said rectifier, switch means for shorting said resistance at all times except when the instrument is set to measure A. C. voltages of a range the full scale deflection of which is comparable with the A. C. voltage under which the applied volts-rectified volts characteristic of the rectifier is not straight, the arrangement being such that for any given proportion of the full scale value on any given range, the secondary output current as fed to the rectifier is constant, whereby the same scale shape is obtained on all ranges, tappings on the transformer primary winding, a switch to connect the A. C. input to the appropriate tapping on the transformer primary, switching means to disconnect the movement from the rectifier and from the transformer when D. C. readings are to be taken, a series resistance, switch means to connect said series resistance in series with the primary of the transformer for voltage readings on A. C. or alternatively in series with the movement when said movement is disconnected from the rectifier for voltage readings on D. C., a shunt resistance for said movement, switching means to connect said shunt resistance across the movement for current readings on D. C., tappings on said series and shunt resistances and switch means to connect a D. C. input to the appropriate tapping on the series or shunt resistance for D. C. voltage or current measurements.

7. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, a resistance in series with said transformer secondary and said rectifier, switch means for shorting said resistance at all times except when the instrument is set to measure A. C. voltages of a range the full scale deflection of which is comparable with the A. C. voltage under which the applied volts-rectified volts characteristic of the rectifier is not straight, the arrangement being such that for any given proportion of the full scale value on any given range, the secondary ouput current as fed to the rectifier is constant, whereby the same scale shape is obtained on all ranges, tappings on the transformer primary winding, a series resistance connected to one of the tappings on said primary, a switch to connect the A. C. input to the appropriate tapping or to the series resistance connected to the one tapping on the transformer primary, switching means to disconnect the movement from the rectifier and from the transformer when D. C. readings are to be taken, a series resistance, switch means to connect said series resistance in series with the primary of the transformer for voltage readings on A. C. or alternatively in series with the movement when said movement is disconnected from the rectifier for voltage readings on D. C.. a shunt resistance for said movement.

switching means to connect said shunt resistance across the movement for current readings on D. C., tappings on said series and shunt resistances and switch means to connect a D. C. input to the appropriate tapping on the series or shunt resistance for D. C. voltage or current measurements.

8. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a switch to connect the A. C. input to the appropriate tapping on the transformer primary, switching means to disconnect the movement from the rectifier when D. C. readings are to be taken, a series resistance and a shunt resistance for said movement, tappings on said series and shunt resistance, switch means to connect a D. C. input to the appropriate tapping on the series or shunt resistance for D. C. voltage or current measurements, input terminals to said instrument, one of which is connected to a contact point both on the switch for connecting the A. C. input to the tappings on the transformer primary and on the switch for connecting the D. C. input to the tappings on the series resistance or on the shunt resistance, and a connection between the switch contact members so that unless the A. C. switch is appropriately set D. C. readings cannot be carried out, or vice versa.

9. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a switch to connect the A. C. input to the appropriate tapping on the transformer primary, switching means to disconnect the movement from the rectifier and from the transformer when D. C. readings are to be taken, a series resistance, switch means to connect said series resistance in series with the primary of the transformer for voltage readings on A. C. or alternatively in series with the movement when said movement is disconnected from the rectifier for voltage readings on D. C., a shunt resistance for said movement, switching means to connect said shunt resistance across the movement for current readings on D. C., tappings on said series and shunt resistances, switch means to connect a D. C. input to the appropriate tapping on the series of shunt resistance for D. C. voltage or current measurements, input terminals to said instrument, one of which is connected to a contact point both on the switch for connecting the A. C. input to the tappings on the transformer primary and on the switch for connecting the D. C. input to the tappings on the series resistance or on the shunt resistance, and a connection between the switch contact members so that unless the A. C. switch is appropriately set D. C. readings cannot be carried out, or vice versa.

10. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a series resistance connected to one of the tappings on said primary, a switch to connect the A. C. input to the appropriate tapping or to the series resistance connected to the one tapping on the transformer primary, switching means to disconnect the movement from the rectifier when D. C. readings are to be taken, a series resistance and a shunt resistance for said movement, tappings on said series and shunt resistances, switch means to connect a D. C. input to the appropriate tapping on the series or shunt resistance for D. C. voltage or current measurements, input terminals to said instrument, one of which is connected to a contact point both on the switch for connecting the A. C. input to the tappings on the transformer primary and on the switch for connecting the D. C. input to the tappings on the series resistance or on the shunt resistance, and a connection between the switch contact members so that unless the A. C. switch is appropriately set D. C. readings cannot be carried out, or vice versa.

11. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, a resistance in series with said transformer secondary and said rectifier, switch means for shorting said resistance at all times except when the instrument is set to measure A. C. voltages of a range the full scale deflection of which is comparable with the A. C. voltage under which the applied volts-rectified volts characteristic of the rectifier is not straight, the arrangement being such that for any given proportion of the full scale value on any given range, the secondary output current as fed to the rectifier is constant, whereby the same scale shape is obtained on all ranges, tappings on the transformer primary winding, a switch to connect the A. C. input to the appropriate tapping on the transformer primary, switching means to disconnect the movement from the rectifier when D. C. readings are to be taken, a series resistance and a shunt resistance for said movement, tappings on said series and shunt resistances, switch means to connect a D. C. input to the appropriate tapping on the series of shunt resistance for D. C. voltage or current measurements, input terminals to said instrument, one of which is connected to a contact point both on the switch for connecting the A. C. input to the tappings on the transformer primary and on the switch for connecting the D. C. input to the tappings on the series resistance or on the shunt resistance, and a connection between the switch contact members so that unless the A. C. switch is appropriately set D. C. readings cannot be carried out, or vice versa.

12. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a switch to connect the A. C. input to the appropriate tapping on the transformer primary, switching means to disconnect the movement from the rectifier and from the transformer when D. C. readings are to be taken, a series resistance, switch means to connect said series resistance in series with the primary of the transformer for voltage readings on A. C. or alternatively in series with the movement when said movement is disconnected from the rectifier for voltage readings on D. C., a shunt resistance for said movement, switching means to connect said shunt resistance across the movement for current readings on D. C., tappings on said series and shunt resistances, switch means to connect a D. C. input to the appropriate tapping on the series or shunt resistance for D. C. voltage or current measurements, a battery and further resistances to adapt the instrument to measure resistances and means to compensate for variation in the battery voltage.

13. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, a resistance in series with said transformer secondary and said rectifier, switch means for shorting said resistance at all times except when the instrument is set to measure A. C. voltages of a range the full scale deflection of which is comparable with the A. C. voltage under which the applied volt-rectified volts characteristic of the rectifier is not straight, the arrangement being such that for any given proportion of the full scale value on any given range, the secondary output current as fed to the rectifier is constant, whereby the same scale shape is obtained on all ranges, tappings on the transformer primary winding, a switch to connect the A. C. input to the appropriate tapping on the transformer primary, switching means to disconnect the movement from the rectifier when D. C. readings are to be taken, a series resistance and a shunt resistance for said movement, tappings on said series and shunt resistances, switch means to connect a D. C. input to the appropriate tapping on the series or shunt resistance for D. C. voltage or current measurements, a battery and further resistances to adapt the instrument to measure resistances and means to compensate for variation in the battery voltage.

14. A multi-range combined current and voltage measuring instrument for A. C. and D. C. comprising a single moving coil indicating movement, a bridge connected rectifier to feed the movement, a transformer, to the primary of which are fed the A. C. currents and voltages to be measured and the secondary of which feeds the bridge connected rectifier, tappings on the transformer primary winding, a switch to connect the A. C. input to the appropriate tapping on the transformer primary, switching means to disconnect the movement from the rectifier when D. C. readings are to be taken, a series resistance and a shunt resistance for said movement, tappings on said series and shunt resistance, switch means to connect a D. C. input to the appropriate tapping on the series or shunt resistance for D. C. voltage or current measurements, input terminals to said instrument, one of which is connected to a contact point both on the switch for connecting the A. C. input to the tappings on the transformer primary and on the switch for connecting the D. C. input to the tappings on the series resistance or on the shunt resistance, a connection between the switch contact members so that unless the A. C. switch is appropriately set D. C. readings cannot be carried out, or vice versa, a battery and further resistances to adapt the instrument to measure resistances and means to compensate for variation in the battery voltage.

15. A multi-range combined current and voltage measuring instrument for alternating current and direct current measurements, comprising a single moving coil indicating movement, a bridge connected metal rectifier, a transformer comprising a primary winding and a secondary winding, a resistance, connections from said secondary winding through the resistance to the bridge connected rectifier, connections from said bridge connected rectifier to said moving coil indicating movement, switching means for short circuiting said resistance at all times during alternating current measurements except when the instrument is adapted to read a range of alternating current voltages, the maximum reading of which is comparable with the voltage under which the bridge connected rectifier does not rectify, tappings on the primary winding, an alternating current switch comprising a contact arm and a plurality of contacts with any one of which the contact arm can make contact, a tapped series resistance, connections between the contact studs of the A. C. switch and said tappings on said series resistance and said tappings on the primary of the transformer to adapt the instrument to various ranges of A. C. currents and voltages, resistances in certain of said connections to the tappings on the primary of the transformer, the arrangement being such that for any given proportion of the full scale value on any given range, the secondary output current as fed to the rectifier is constant, whereby the same scale shape is obtained for A. C. measurements on all ranges, a D. C. selector switch comprising a contact arm and a plurality of studs with any one of which the contact arm can make contact, a tapped shunt resistance, connections between said contacts on the D. C. switch to said tappings on said series resistance and said shunt resistance, switching means to disconnect the moving coil indicating movement from the rectifier to disconnect the series resistance from the primary of the transformer and to connect the same in series with the moving coil indicating movement for D. C. voltage and current measurements, input terminals to the instrument, a connection from one of said input terminals to one of the contacts on each of the D. C. and A. C. selector switches and a connection electrically connecting together the contact arms of the D. C. and A. C. switches so that unless the A. C. switch is appropriately positioned D. C. readings cannot be taken and vice versa.

16. A multi-range combined current and voltage measuring instrument for alternating current and direct current measurements, comprising a single moving coil indicating movement, a bridge connected metal rectifier, a transformer comprising a primary winding and a secondary winding, a resistance, connections from said secondary winding through the resistance to the bridge connected rectifier, connections from said bridge connected rectifier to said moving coil indicating movement, switching means for short circuiting said resistance at all times during alternating current measurements except when the instrument is adapted to read a range of alternating current voltages, the maximum reading of which is comparable with the voltage under which the bridge connected rectifier does not rectify, tappings on the primary winding, an alternating current switch comprising a contact arm and a plurality of contacts with any one of which the contact arm can make contact, a tapped series resistance, connections between the contact studs of the A. C. switch and said tappings on said series resistance and said tappings on the primary of the transformer to adapt the instrument to various ranges of A. C. currents and voltages, resistances in certain of said connections to the tappings on the primary of the transformer, the arrangement being such that for any given proportion of the full scale value on any given range, the secondary output current as fed to the rectifier is constant, whereby the same scale shape is obtained for A. C. measurements on all ranges, a D. C. selector switch comprising a contact arm and a plurality of studs with any one of which the contact arm can make contact, a tapped shunt resistance, connections between said contacts on the D. C. switch to said tappings on said series resistance and said shunt resistance, switching means to disconnect the moving coil indicating movement from the rectifier to disconnect the series resistance from the primary of the transformer and to connect the same in series with the moving coil indicating movement for D. C. voltage and current measurements, input terminals to the instrument, a connection from one of said input terminals to one of the contacts on each of the D. C. and A. C. selector switches, a connection electrically connecting together the contact arms of the D. C. and A. C. switches so that unless the A. C. switch is appropriately positioned D. C. readings cannot be taken and vice versa, a battery, further resistances, switch means to adapt the instrument to measure various ranges of resistances and means for compensating for the alteration in the voltage of the battery.

HUGH SUTHERLAND MACADIE.